United States Patent [19]

Callahan

[11] Patent Number: 5,233,837
[45] Date of Patent: Aug. 10, 1993

[54] PROCESS AND APPARATUS FOR PRODUCING LIQUID CARBON DIOXIDE

[75] Inventor: Richard A. Callahan, Waitsfield, Vt.

[73] Assignee: Enerfex, Inc., Burlington, Vt.

[21] Appl. No.: 940,281

[22] Filed: Sep. 3, 1992

[51] Int. Cl.$^5$ ............................ F25J 3/02; F25J 3/00; F01K 17/00

[52] U.S. Cl. .......................................... 62/38; 62/18; 62/24; 62/36; 62/44; 60/648

[58] Field of Search .................... 62/18, 24, 36, 38, 44; 60/648

[56] References Cited

U.S. PATENT DOCUMENTS

| | | | |
|---|---|---|---|
| 4,371,381 | 2/1983 | Schuftan | 62/24 X |
| 4,595,404 | 6/1986 | Ozero et al. | 62/24 X |
| 4,602,477 | 7/1986 | Lucadamo | 62/24 |
| 4,704,146 | 11/1987 | Markbreiter et al. | 62/24 X |
| 4,759,786 | 6/1988 | Atkinson et al. | 62/36 X |
| 4,923,493 | 5/1990 | Valencia et al. | 62/24 X |
| 4,936,887 | 6/1990 | Waldo et al. | 62/24 |
| 4,952,223 | 8/1990 | Kirshnamurthy et al. | 62/24 X |
| 4,990,168 | 2/1991 | Saver et al. | 62/24 |
| 5,049,174 | 9/1991 | Thorogood et al. | 62/24 |
| 5,100,635 | 3/1992 | Krishnamurthy et al. | 62/24 X |

Primary Examiner—Henry A. Bennet
Assistant Examiner—Christopher B. Kilner
Attorney, Agent, or Firm—Sughrue, Mion, Zinn Macpeak & Seas

[57] ABSTRACT

A process for producing liquid carbon dioxide. A process stream which comprises carbon dioxide, balance substantially nitrogen and water, is cooled so that a minor amount of the water is condensed out. The process stream is compressed so that substantially all of the water but trace amounts is condensed out. Next, the process stream is cleaned to remove the trace amounts of water, any long-chain hydrocarbons present and any particulates present. The process stream is then separated into a nitrogen-rich gaseous stream and a carbon dioxide-rich gaseous stream. The carbon dioxide-rich gaseous stream is then compressed and the nitrogen-rich gaseous stream is expanded to produce an expanded nitrogen-rich gaseous stream. The energy of the expanding is used to compress the carbon dioxide-rich gaseous stream. The compressed carbon dioxide-rich gaseous stream is cooled to liquefy the carbon dioxide in the stream and reduce the temperature of the gaseous nitrogen in the stream. The liquefied carbon dioxide is withdrawn as product. The liquefying of the carbon dioxide-rich gaseous stream is by using the expanded nitrogen-rich gaseous stream. After the liquefying, the nitrogen-rich gaseous stream is used to perform at least part of the first cooling. In a preferred form, the process stream results from combusting a mixture of fuel and oxygen in a heat engine to drive an electrical generator with the product of the heat engine to produce electricity and also yielding the process stream. Apparatus for the production of liquid carbon dioxide which includes devices to perform each of the process steps.

11 Claims, 1 Drawing Sheet

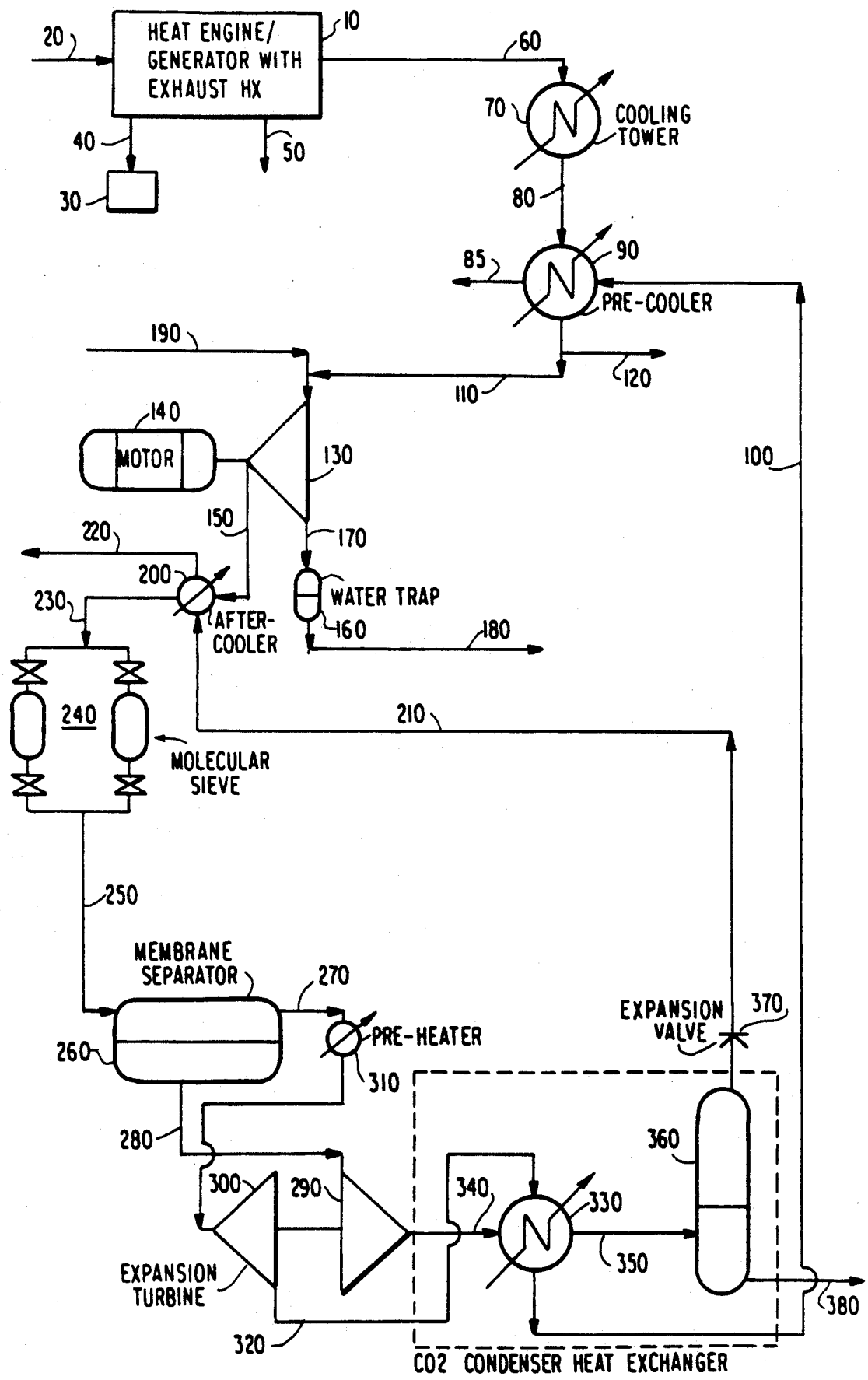

PROCESS AND APPARATUS FOR PRODUCING LIQUID CARBON DIOXIDE

BACKGROUND OF THE INVENTION

1. Field of the Invention

The present invention relates to a process and apparatus for the production of liquid carbon dioxide and, in a most preferred form, permits the trigeneration of electricity, heat and liquid carbon dioxide.

2. Description of the Prior Art

U.S. Pat. No. 4,942,734 relates to a process where methane-rich fuel is combusted in a gas turbine (internal combustion heat engine). Additional methane-rich fuel is injected into the exhaust stream resulting from the combustion step to fire a steam boiler which produces steam to turn a steam turbine (external combustion heat engine), the gas turbine and the steam turbine being directly connected to an electric generator. In accordance with the present invention, any heat engine may be used, and the same can be internally or externally fired by any fuel and directly connected to either an electric generator or any other mechanical device that can do work, such as a compressor. The subject patent relates to the cogeneration of electricity and liquid carbon dioxide, whereas in accordance with the present invention the trigeneration of electricity, heat and liquid carbon dioxide is achieved. While the subject patent uses an amine solvent absorption column selective for carbon dioxide and a stripper column to remove carbon dioxide from flue gas, in accordance with the present invention it is most preferred to use a gas permeable membrane which is selective for carbon dioxide to remove carbon dioxide from the process stream. The subject patent involves the use of an ammonia absorption refrigeration cycle to liquefy compressed and dried carbon dioxide in a carbon dioxide condenser. In accordance with the present invention, an expansion turbine is used to extract work from a high-pressure residual nitrogen-rich process stream which is preferably generated in the membrane separator above mentioned. The process of the present invention also involves a recuperative heat exchange between the resultant expanded low temperature residual nitrogen-rich stream and a compressed and dried carbon dioxide-rich permeate stream in a carbon dioxide condenser. In accordance with the present invention, either an absorption or vapor-compression refrigeration cycle can also be used to liquefy compressed and dried carbon dioxide in a carbon dioxide condenser.

U.S. Pat. No. 5,001,902 relates to the cogeneration of electricity and liquid carbon dioxide whereas the process of the present invention permits the trigeneration of electricity, heat and liquid carbon dioxide. The subject patent involves the use of a vaporizable liquid fuel, particularly alcohols and hydrocarbons, fired in a flameless porous fiber burner with low NOX production which is used to make high pressure steam in a boiler which turns a steam turbine which drives an electric generator. In accordance with the process of the present invention, any heat engine, internally or externally fired by any fuel, can be directly connected to either an electric generator or any other mechanical device that can do work, such as compressor, for example, although it is preferred in accordance with the present invention to use a natural gas or methane fired internal combustion engine connected directly to an electric generator. The subject patent requires that liquid fuel be vaporized by injection into combustion air preheated by heat exchange with a burner flue gas. Fuel pre-treatment is not needed in the present invention. The subject patent involves the use of an amine solvent absorption column for the recovery of carbon dioxide from flue gas supplied by a flue gas blower and a stripper column with a reboiler heated by steam from an intermediate pressure stage of the steam turbine. It is most preferred in accordance with the present invention to use a gas-permeable membrane which is selective for carbon dioxide to remove carbon dioxide from a process stream. The subject patent specifies liquefication of carbon dioxide in an unspecified system; the process of the present invention involves a very specific procedure for liquefication of carbon dioxide.

U.S. Pat. No. 5,025,631 relates to the cogeneration of electricity and refrigeration with low NOX. The process of the present invention enables the trigeneration of electricity, heat, and liquid carbon dioxide. The subject patent involves the use of a gaseous fuel which is preheated at high pressure by a heat exchange with hot flue gas in a pre-heater. The high-pressure fuel gas is then expanded in a turbo-expander (expansion turbine) which drives a centrifugal compressor for the refrigerant vapor of a refrigeration system. The process of the present invention does not require any fuel pretreatment. The subject patent discloses expanded fuel gases admixed with a limited amount of air and then fired in a flameless porous fiber burner with low NOX production and other pollutants which is used to make high-pressure steam in a boiler which turns a steam turbine that drives an electric generator. In accordance with the process of the present invention, any heat engine, internally or externally fired by any fuel and directly connected to either an electrical generator or any other mechanical device that can do work, such as a compressor, for example, can be used. It is preferred in the present invention to use a natural gas or methane-fired internal combustion engine connected directly to an electric generator.

SUMMARY OF THE INVENTION

The present invention relates to a process and apparatus for the production of liquid carbon dioxide. It should be understood that in accordance with the present invention it is possible to start with a process stream which comprises from about 10 to about 50% carbon dioxide, more preferably about 10 to about 20% carbon dioxide, balance typically air. In this instance, the process of the present invention would begin with the first cooling step in a cooling tower as later discussed.

In the broad, preferred form of the present invention, the process of the present invention comprises:

combusting a hydrocarbon fuel and oxygen, typically a hydrocarbon fuel and air, to form a process stream which comprises carbon dioxide, nitrogen and water;

cooling the process stream in a first cooling step, whereby a minor amount of the water is condensed out of the process stream and removed from the process stream;

compressing the process stream in a first compressor, whereby substantially all of the remaining water is removed from the process stream except for a trace amount of water;

removing the trace amount of water and any hydrocarbons larger than methane from the process stream;

separating the carbon dioxide and nitrogen in the process stream to form two streams, a first stream which comprises substantially completely nitrogen and a second stream which comprises substantially all of the carbon dioxide in the process stream and the balance of the nitrogen in the process stream;

expanding the first stream to yield an expanded stream which comprises substantially completely nitrogen and using the work of the expanding to drive a second compressor;

compressing the second stream which comprises substantially all of the carbon dioxide in the process stream and the balance of the nitrogen in the process stream;

cooling the compressed second stream using the expanded stream which comprises substantially completely nitrogen, whereby said compressed second stream is separated into liquid carbon dioxide and gaseous nitrogen; and then forwarding the expanded stream which comprises substantially completely nitrogen to the first cooling step where the expanded stream which comprises substantially completely nitrogen is used to cool the process stream.

In a most preferred form of the present invention, however, the present invention relates to a process for the trigeneration of electricity, heat and liquid carbon dioxide. This makes the economics of the present invention much more attractive since the electricity and heat which are generated can be used for other purposes. A heat engine drives an electric generator and a compression/cooling stage to produce liquid carbon dioxide. Combustion exhaust from the heat engine which becomes the process stream is stripped o heat through a series of heat exchangers providing thermal energy which can be used as desired. The final heat exchange or cooling step typically involves the use of a precooler where nitrogen which has been separated from carbon dioxide in a subsequent step of the process of the present invention is used as the cooling medium. The cooled process stream is then subjected to a first compression to elevate the pressure thereof so that the process stream can be driven through subsequent process steps. After the first compression, the cooled process stream is further cooled using nitrogen which has been separated in a subsequent step of the process of the present invention, as later explained. The cooled pressurized process stream is then cleaned, i.e., stripped of water, hydrocarbons, and particulate matter. The cleaned process stream is then separated into a stream which is essentially complete nitrogen (nitrogen-rich gaseous stream) and a carbon dioxide/nitrogen stream which contains at least 50% carbon dioxide (carbon dioxide/nitrogen stream). The carbon dioxide/nitrogen stream is then compressed. The compressor which compresses the carbon dioxide/nitrogen stream is driven by an expansion turbine; the expansion turbine is powered by the expansion of the nitrogen-rich gaseous stream. After performing its work in the expansion turbine, the gaseous nitrogen stream is used to cool the carbon dioxide/nitrogen stream which has been compressed. After the gaseous nitrogen stream serves its cooling function it is then cycled to the last heat exchange or cooling step earlier mentioned, which is just before the cleaning step. Upon cooling the carbon dioxide/nitrogen stream, the carbon dioxide is liquefied and the nitrogen, which remains in gaseous form, is cooled. The liquid carbon dioxide may then be removed as product from the process of the present invention. The nitrogen-rich gaseous stream which results is passed through an expansion valve and is used to cool the process stream in the aftercooler (or aftercoolers, if more than one aftercooler is used) just after the first compressor earlier discussed.

The apparatus of the present invention, in broad form, comprises:

a) means for cooling a process stream, which process stream comprises nitrogen, carbon dioxide and water whereby a minor portion of the water is removed therefrom;

b) means for compressing the cooled process stream from step a), whereby substantially all of the remaining water is removed therefrom, leaving only trace amounts of water;

c) means for removing the trace amounts of water and any hydrocarbons larger than methane from the compressed process stream from step b);

d) means for separating the process stream from step c) into
   d1) a process stream which is substantially completely nitrogen; and
   d2) a process stream which contains substantially all of the carbon dioxide in the process stream and the balance of the nitrogen in the process stream;

e) means for expanding the process stream d1) into an expanded process stream d1) and means for forwarding the expanded process stream d1) to means g) for cooling a compressed stream d2), which expanding means drives;

f) means for compressing said process stream d2);

g) means for cooling the compressed process stream d2), whereby the process stream d2) is separated into a liquid carbon dioxide stream g1) and a gaseous stream which is substantially completely nitrogen g2), the means for cooling the compressed process stream d2) being the expanded process stream d1) generated in step e); and h) means for forwarding the gaseous stream d1) which is substantially completely nitrogen from step g) to the means for cooling the process stream of step a), where the gaseous stream d1) which is substantially completely nitrogen from step g) performs the cooling of step a).

In the preferred aspect of the present invention, the gaseous stream which is substantially completely nitrogen g2) is forwarded to means to cool the process stream between means b) and c).

The most preferred apparatus for use in the present invention involves combustion means and related means for the earlier described trigeneration process of the present invention.

For any user of carbon dioxide, the major benefits of the present invention are:

to provide at least a 50% reduction in market rate electricity cost and to provide a substantial reduction in all market rate energy costs for process or space heating;

to eliminate all process costs of producing carbon dioxide and nitrogen;

to provide a single natural gas utility bill equal to 25% to 50% of the total of all previous utility bills;

to provide apparatus which is easily portable.

BRIEF DESCRIPTION OF THE DRAWING

The FIGURE illustrates a currently preferred embodiment of the invention.

DESCRIPTION OF PREFERRED EMBODIMENTS

The general process steps of the present invention are first described and then a discussion is offered with respect to FIG. 1 which will include data of a specific example of the present invention. Hereafter, all parts and percentages (%) are by weight, unless otherwise indicated, and the discussion regarding the fuel supplied is with respect to the ratio of fuel to air, not oxygen.

The present invention is primarily discussed in terms of the most preferred embodiment of the present invention, where the first step of the present invention is a combustion step.

However, if a process stream is available which comprises at least about 10 to about 50%, more preferably about 10 to about 20%, and most preferably about 15 to about 17% carbon dioxide, balance typically air, the same can be processed in accordance with the present invention. Depending upon the temperature of such a process stream, the first cooling tower is used in the present invention may or may not be necessary. In any case, the process of the present invention as later described from the precooler on will be followed.

The first step of the preferred process of the present invention is a combustion step. A hydrocarbon fuel and oxygen mixture is combusted. Any hydrocarbon fuel can be used in accordance with the present invention, for example, natural gas, methane, ethane, propane, butane, naphtha, diesel fuel, kerosene, gasoline, etc. The source of oxygen can be any source of oxygen, but as a practical matter, air is used.

Any heat engine/generator can be used, and such devices are commercially available. The preferred heat engine is typically a diesel engine which has been modified to burn natural gas, similar to those produced by Caterpillar and Waukesha. The heat engine is directly connected to an electromagnetic mechanical generator, i.e., an alternator.

The hydrocarbon fuel/oxygen by volume ration can be relatively freely varied, but is preferably as close to as stoichiometric as possible. For example, 100% fuel energy can be introduced at 9.5% by volume methane, 90.5% by volume air. Pure methane and oxygen will burn completely or stoichiometrically to carbon dioxide in a volume ratio of 1:2, respectively. Air at sea level is approximately 21% by volume oxygen, and thus methane and air will burn in a ration of 1:2÷0.21 or 1:9.5238. As a general standard, the Caterpillar Company sets their engines to operate at a fuel-to-air by volume ratio of 1:9.5 to achieve the best economy, life, and operating response. This ratio is preferred in the process of the present invention because it maximizes the concentration of carbon dioxide in the exhaust or process stream. A richer fuel-to-air ratio would increase hydrocarbons in the exhaust at the expense of carbon dioxide. A leaner fuel-to-air ratio would increase oxygen in the exhaust at the expense of carbon dioxide. If one skilled in the art is willing to accept these tradeoffs, or course, the fuel to air ratio can be varied from the preferred figure above discussed.

Combustion in the heat engine/generator results in heat in the form of a hot exhaust stream, hot jacket water and thermal radiation, which can be used as desired. For example, the combustion can result in 10% fuel energy out as thermal radiation, 30% fuel energy out as electricity and 50% fuel energy out as available thermal energy, with 10% fuel energy out as thermal loss to the process stream. Electricity is generated by a typical wire-wound armature mechanically rotated through a magnetic field. The armature shaft is directly connected to the heat engine shaft by a mechanical linkage.

A process stream results which comprises $CO_2$, $N_2$, and $H_2O$ with traces of other materials. While not limiting, typically the initial process stream will comprise about 15% carbon dioxide, about 71% nitrogen, about 12% water, about 1% argon, and trace amounts of carbon monoxide, nitrous oxide, oxygen, and hydrocarbons, typically on the order of 1% of such trace amounts.

The temperature of the process stream from the heat engine/generator before any cooling can be freely varied but will normally simply by the temperature at which combustion occurs, and this will typically be in the order of about 900° F. to about 1150° F.

Following combustion, the process stream is cooled. Any cooling means can be used, but typically one or more conventional heat exchangers where external water or air streams are the cooling means will be used. If desired, and this is generally preferred, an initial heat exchange can be conducted at the exit of the heat engine/generator. If such an initial heat exchange is performed, the process stream might be at 280° F. and at about 15 psia.

While not mandatory, usually at least two subsequent heat exchange steps will be conducted. The second heat exchange will typically be with ambient air and/or with cooling water in a cooling tower.

The third heat exchange is in what we call a precooler and will typically involve optional ambient air and/or cooling water and a mandatory recycled gaseous nitrogen stream, which results from a later step in the process of the present invention, where gaseous nitrogen and liquid carbon dioxide are separated.

In a most preferred embodiment of the present invention, three heat exchange devices are used, namely a plate and frame heat exchanger which is an integral part of the heat engine/generator of the present invention and where cooling is with water, a second heat exchange using ambient air and water in a cooling tower and a final heat exchange in the precooler using a cooled nitrogen recycle stream from the carbon dioxide condenser cooling side. The thermal energy extracted from the plate and frame heat exchanger can be used to supply heat to other parts of the process of the present invention where such is needed, for example, to heat for purposes of regenerating the molecular sieves.

While discussed in more detail in the sequence of the process of the present invention, the process of the present invention uses three methods to remove water from the process stream. First, the process stream temperature is reduced successively in a cooling tower and in a precooler to a temperature of about 122° F. which is below the dew point of the process stream. The water content is reduced about 25% from about 12% to about 8-9% at this point, the water in this instance being removed at about 122° F. Next, the process stream is compressed to a high pressure of about 200 to about 300 psia at which point the temperature of the process stream is substantially below the dew point of the process stream at that pressure. The water content is thus reduced about 96% from about 8-9% to about 0.45%. Finally, the process stream is essentially completely dried by being passed through a molecular sieve column to a dew point of −100° F. or less than 1 ppm.

In its broadest form, however, in accordance with the present invention, it is theoretically possible to use only the recycled gaseous nitrogen stream in the precooler, but economics make it highly preferred to do initial heat exchanges or coolings with ambient air and/or cooling water.

As earlier indicated, the temperature at which combustion occurs will typically be on the order of about 900 to about 1150° F. The process stream is typically initially cooled in the first heat exchanger, which in the most preferred embodiment of the present invention is integral with the heat engine/generator, to a temperature on the order of about 250 to about 280° F.

In the most preferred embodiment of the present invention, the second cooling in the cooling tower is to a temperature on the order of about 200° to about 220° F.

In the most preferred embodiment in accordance with the present invention where the third cooling step with nitrogen is used, the process stream is cooled to a temperature of about 120° F. to 125° F. and is at a pressure of about 14.7 psia to about 15.7 psia.

Following the cooling procedure of the present invention, the process stream is then subjected to a first compression. Pressure is applied at this point of the process for a number of reasons, one of which is to provide a driving force to move the process stream through the later-to-be-described cleaning step and to provide the necessary pressure needed for, for example, passage through a membrane separator. In addition to providing the necessary driving force to move the process stream through the cleaning step, this first compression reduces the volume of the process stream flow, i.e., reduces the cubic feet per minute of the process stream, and permits the size of process equipment to be reduced, for example, the apparatus used for the cleaning step. Further, since the first compression raises the temperature of the dew point of the process stream, almost all of the remaining water is removed from the process stream and there is a lighter load on the molecular sieves which are preferably used as part of the cleaning procedure of the present invention.

During this first compression step, the process stream is compressed from about 15 psia to about 200 to bout 300 psia. The final pressure is determined by the required process stream pressure to operate the membrane separator. The goal here is to maximize the partial pressure drop of carbon dioxide across the membrane, thus effecting maximum recovery of carbon dioxide from the feed and maximum concentration of carbon dioxide in the process permeate stream later discussed. If the process permeate stream pressure is reduced to less than 200 psia, then a secondary compression step is required to increase the pressure back to at least about 200 psia. At a 50% carbon dioxide process permeate stream concentration, the minimum carbon dioxide partial pressure must be 100 psia to achieve a condensation temperature of −54° F.

The first compression permits removal of about 96% of the remaining water present in the process stream. In addition, compressing the process stream at this stage provides sufficient pressure throughout the system so that all unit operations can be conducted. Thus, since the last cooling step in the preferred embodiment of the present invention removes about ¼ to about ⅓ of the total water in the process stream, e.g., process water vapor is reduced from about 12% to about 8-9%, the compression step which removes about 96% of the remaining water vapor reduces the process water vapor concentration to about 0.45%. For instance, in the compression step work-in might be about 0.175 kWh per pound of liquid carbon dioxide eventually produced, and the temperature of the process stream is reduced in the aftercooler to about 86° F. which will also, of course, be the temperature of the water removed.

If desired, the compression, which precedes the cleaning and separation steps, may be a single or double stage where either or both stages may be powered by an electric motor or an expansion turbine where, for example, nitrogen generated in a later step of the process of the present invention can be used to drive the expansion turbine. In the embodiment which is later discussed, the compression which precedes the cleaning and separation steps is a single stage compression.

The second compression, namely the compression which follows the cleaning and separation steps of the present invention, is typically a single step compression powered by either an electric motor or an expansion turbine. In the embodiment later discussed, the secondary compressor is powered by an expansion turbine.

The composition of the process stream after cleaning where compression precedes cleaning is the same as that before compression where compression follows cleaning. Both process configurations presume that all of the water is removed prior to the separation step of the present invention. Typically the composition will be about 16.9% carbon dioxide, about 79.8% nitrogen, 1.8% in total of carbon monoxide, oxygen, nitrous oxide and hydrocarbons and 1.5% argon, which for process purposes can be treated as 17% carbon dioxide, 83% nitrogen and trace water/hydrocarbons.

Following the first compression, the process stream is then cooled in an aftercooler using nitrogen which is separated in a later step of the process of the present invention. The process stream after the cooling step which follows the first compression step of the present invention will typically be at a pressure of about 200 psia to about 300 psia and a temperature of about 80° F. to about 90° F., e.g., 86° F. The cooling medium (nitrogen which as been separated from carbon dioxide in the process stream of the present invention in s subsequent step of the present invention) is forwarded to the aftercooler which follows the first compressor of the present invention via an expansion valve to lower the temperature of the nitrogen.

After cooling the process stream, it is subjected to the cleaning step of the present invention.

The cleaning step basically involves removal of substantially any remaining trace of water in the process stream, removes any trace long chain hydrocarbons present (longer than methane), and removes any particulates if they are present. It is to be noted, however, that any methane which is present passes through the cleaning step of the present invention and eventually exits the system of the present invention with the nitrogen.

As earlier explained, in the cleaning step, the process stream is essentially completely dried by being passed through a molecular sieve column to a dew point of −100° F. or less than 1 ppm. Any molecular sieve which will remove the water can be used in accordance with the present invention, but typically the molecular sieve is a dehydrated aluminosilicate hydrate (or zeolite) that aggressively adsorbs water and which can be successively regenerated by heating. Such products are developed by and are currently available from the UOP, Inc.

The exhaust stream of a typical natural gas fired internal combustion engine contains a total hydrocarbon (HC) concentration of about 0.07% of which 83% is natural gas or methane ($CH_4$) and 17% is non-methane HC. The non-methane HCs are most preferably removed by a first particle filter trap and then by using, for example, a draining coalescing filter trap, both available from the Wilkerson Company and the Dollinger Company. Any methane present passes through the cleaning step and eventually will be vented to the atmosphere with any nitrogen stream which is vented to the atmosphere. Any non-methane or long-chain hydrocarbons (that are not removed in the prior coalescing particle filters) are removed by adsorption on an activated carbon sieve column. The activated carbon is available from the Calgon Company.

Particulate matter can be removed from the process stream using, for example, a reversing coalescing filter which is effective to a particle size of $0.01\mu$ and which is available from the Wilkerson Company and the Dollinger Company. There is essentially 0% dry particulate matter in the process stream as it exits the heat engine/generator exhaust. The only source of dry particulate matter is carbon particles from the activated carbon column, and it is these particles that the reversed coalescing filter traps.

Each individual step in the cleaning procedure of the present invention can be performed once or a number of times and can be accomplished using any desired means.

One preferred embodiment of the present invention, the cleaning step will involve a first particle material removal with a particle filter, removal of water in a molecular sieve, a second removal or particulate material with a particle filter, removal of hydrocarbons with activated carbon, and then a final removal of particulate material with a particle filter.

Following the cleaning step of the present invention, the process stream is typically at a temperature of about 77° to about 125° F. and at a pressure of about 200 psia to about 300 psia, e.g., 86° F. and 200 psia. The process stream at this stage normally comprises from about 16 to about 20% carbon dioxide and about 83 to about 79% nitrogen, respectively, balance, e.g., argon to total 100 %, which, for process purposes, can be treated as 17% carbon dioxide and 83% nitrogen.

The process stream is then separated into a nitrogen-rich gaseous stream and a carbon dioxide/nitrogen gaseous stream.

Separation can be achieved by traditional means such as absorption through carbonate formation using an equilibrium reaction with a recycled reactant such as ethanolamine and subsequent thermal stripping to release a carbon dioxide-rich stream. However, it is currently preferred to use a membrane gas separator such as a hollow fiber polyimide polymer available from Medal, a limited partnership between DuPont and Liquid Air, and the use of a membrane gas separator permits simple separation of the process stream in a highly economical fashion and permits avoidance of the rather complicated and energy consuming aspects of the absorption approach earlier mentioned. The use of a membrane gas separator in a process and apparatus as disclosed herein is believed to be a unique aspect of the process of the present invention.

After separation, the nitrogen-rich gaseous stream typically will comprise from about 98 to about 99% nitrogen, balance carbon dioxide and a majority of the earlier mentioned trace materials, and will be at a pressure of about 200 psia to about 300 psia and at a temperature of about 77° F. to about 125° F.

After separation, the carbon dioxide/nitrogen gaseous stream will typically comprise from about 50% to about 60% carbon dioxide, balance nitrogen, and will be at a pressure of from about 15 psia to about 20 psia and at a temperature of about 77° F. to about 125° F.

Of the nitrogen entering the separation step, about 81 to about 75% will be present in the nitrogen-rich gaseous stream and about 19 to about 25% will be present in the carbon dioxide/nitrogen gaseous stream, respectively; this latter stream will contain all the carbon dioxide present in the process stream except for trace amounts in the former stream.

For example, the initial process stream might be separated into ⅔ process stream at 86° F. and 200 psia which is 99% nitrogen and 1% carbon dioxide and ⅓ process stream at 86° F. and 15 psia which is 50% nitrogen and 50% carbon dioxide.

The nitrogen-rich stream at about 200 to about 300 psia can optionally be heated, if desired, but in any case is then forwarded to an expansion turbine where it is typically expanded to a pressure of one atmosphere and a temperature of about $-225°$ F. (if expanded from 300 psia) to about $-170°$ F. (if expanded from 200 psia). For example, this could be ⅔ process stream at $-225°$ F. and 15 psia which is 99% nitrogen and 1% carbon dioxide. The work generated in the expansion turbine is used to drive a second compressor in the most preferred embodiment of the present invention. Such expansion turbines/compressors are available from Air Products Cryomachinery and Rotoflow Corp., and the combination is typically called a compander. The expansion turbine is typically a radial flow turbine and the compressor is a centrifugal compressor. The power so extracted is sufficient to increase the process stream pressure from about 15 psia as it exits the membrane separator to about 200 psia, a compression ratio of 13.3:1. If desired, a third compressor can be used, for example, at a lower compression ratio to achieve a process stream pressure of over 200 psia to about 300 psia. In any case, after compression this could be ⅓ process stream at 86° F. and 200 psia which is 50% nitrogen and 50% carbon dioxide. The nitrogen which has been used to drive the expansion turbine which in turn drives the second compressor in the most preferred embodiment of the present invention is then used to condense the carbon dioxide in the carbon dioxide/nitrogen gaseous stream and cool the nitrogen in the carbon dioxide/nitrogen gaseous stream. Following this cooling step, the nitrogen-rich stream is then recycled to the final cooling step of the present invention which occurs just prior to the first compression step of the present invention in the precooler. For example, this recycle stream plus the nitrogen recycle stream from the carbon dioxide condensation step could be 5/6 process stream at 0° F. and 15 psia which is 100% nitrogen.

The carbon dioxide/nitrogen gaseous stream is then subjected to heat exchange. As indicated, the nitrogen from the expansion turbine is used to accomplish the heat exchange. This heat exchange step results in a separation of the entering gaseous stream into liquid carbon dioxide and gaseous nitrogen. The gaseous nitrogen will typically be at a temperature of about $-54°$ F. (partial pressure of about 100 psia) to about $-49°$ F. (partial pressure of about 80 psia). At this point, if desired, the liquid carbon dioxide and the gaseous nitrogen will typically be forwarded to a holding tank where a gravity separation of the liquid carbon dioxide and gaseous nitrogen occurs. For example, this could be 1/6 process stream at −54° F. and 100 psia which is 100% liquid carbon dioxide.

The gaseous nitrogen then exits the holding tank and is passed through an expansion valve where its pressure is reduced to about 15 psia to about 20 psia and its temperature is reduced to about −60° to about −55° F., respectively. It is then used to cool the process stream which exits the first compression stage in the aftercooler. After performing its cooling function, the gaseous nitrogen can be used for any desired purpose.

The liquid carbon dioxide can be withdrawn as needed and used for any purpose.

The following presents data regarding what is contemplated as a specific example of the invention.

A stoichiometric mixture of a methane and air enters heat engine/generator 10, which is typically an internal combustion engine, via line 20, where the fuel/air mixture is combusted to yield a combustion gas stream or process stream which, if not cooled, exits the hat engine/generator 10 at a pressure of about one atmosphere and at about 1,130° F. The methane and air are introduced at a rate of 3300 scfm. The heat engine is kinematically connected to an electrical generator 30 via line 40 to convert about 30% of the input fuel energy into electricity that can be used either in the process of the present invention, an outside process, and/or sold to an electrical utility grid.

Thermal energy equal to about 50% of the input energy during the combustion exits the heat engine/generator via line 50 as hot water at a temperature of 160° F.

The process stream passes through one or more heat exchangers (not shown) in the heat engine/generator 10 where external water or air streams are sensibly heated, thereby lowering the temperature of the process stream to about 280° F. to make available high grade thermal energy equivalent to about 50% of the input fuel energy, as earlier explained. The heated external water or air streams may be used downstream in the process of the present invention or may be used in other applications outside the process of the present invention. The process stream exits the heat engine/generator 10 via line 60. It comprises on the order of 15.1% $CO_2$, 12.3% $H_2O$, 71.2% $N_2$ and 1.3% Ar, with traces of $O_2$, CO, NO, and hydrocarbons. The process stream exits the heat engine/generator 10 at a rate of 799 actual cfm.

The cooled process stream at about one atmosphere and above 280° F. then passes through line 60 to cooling tower 70, where it is further cooled to about 212° F. using a combination of ambient air and water.

The cooled process stream exits the cooling tower 70 via line 80 at a temperature of about 212° F. and a pressure of about one atmosphere. Essentially all of the water remains at this stage as an entrained vapor in the process stream. The composition has not changed from the composition that exits the heat engine/generator 10.

The process stream then enters precooler 90, where it is further cooled to about 122° F. by the sensible heat lift of a recycled cold nitrogen gas stream (containing traces of $O_2$, CO, and NO) which enters precooler 90 via line 100. The recycled cold nitrogen gas stream ($\cong$99% nitrogen) is generated downstream in the process of the present invention as later described. The recycled cold nitrogen gas stream is at about one atmosphere and at about 0° F. and in the precooler the nitrogen stream is warmed to about 136° F., exiting precooler 90 via line 85. The nitrogen can thereafter be used for any desired purpose. As earlier explained, in this step of the process about 25% of the water content of the process stream is condensed out, lowering the water content of the process stream from about 12% to about 8-9%. The water is separated out in a gravity trap (not shown) and leaves the process of the present invention via line 120 at a temperature of about 122° F.

The process stream is then passed via line 110 to the first compressor of the present invention denoted by 130 which is driven by motor 140. The process stream is still at a temperature of about 122° F. and is at a pressure of one atmosphere and comprises 15.7% carbon dioxide, 9.0% water, 74.0% nitrogen, and 1.3% argon. In the first compressor 130 the pressure of the process stream is increased to about 200 psia and the temperature upon discharge from first compressor 130 via line 150 is about 127° F. One effect of the first compressor is to reduce the water content in the process line to about 0.45%, the water being forwarded to water trap 160 via line 170 and then being removed from the process of the present invention via line 180.

If desired, optionally carbon dioxide recycled from storage boil-off can be added to the process stream flowing in line 110 prior to entering the first compressor 130 via line 190 to adjust the carbon dioxide concentration in the process stream to 20%.

The cooled process stream is then passed via line 150 to aftercooler 200 where it is cooled by a nitrogen gas stream which is derived as later explained. The nitrogen gas stream enters aftercooler 200 via line 210 and exits aftercooler 200 via line 220, whereafter the nitrogen may be used for any purpose. As the nitrogen exits aftercooler 200 it is at a temperature of greater than about −60° F. The nitrogen stream has a purity of at least 99%.

The cooled process stream then passes via line 230 to the cleaning step of the present invention, generically indicated by 240. During the cleaning step of the present invention, substantially all of the remaining water is removed from the process stream, substantially all of any long chain hydrocarbons which are present are removed from the process stream and substantially all of any particulates which are present in the process steam are removed.

The resulting process stream is a substantially contaminant-free process stream comprising about 16.9% carbon dioxide, about 79.8% nitrogen, about 1.8% in total of oxygen, carbon monoxide, hydrocarbon (namely methane), and nitrous oxide, and 1.5% argon is at a pressure of about 200 psia and at a temperature of about 86° F. Trace water and any long chain hydrocarbons (i.e., higher in carbon number than methane) are removed via a line (not shown) and the cooled process stream exits the cleaning step of the process of the present invention via line 250.

The nature of the compressor 130 or compressors used is not overly important; the compressors can by or varying types such as screw-type compressors or reciprocating compressors. Useful compressors are commercially available from FES and Sulair.

The compressor 290 will typically be a centrifugal compressor. Such compressors are available from Atlas Copco Rotoflow Corporation, Inc. and Air Products and Chemical Co.

With respect to compressor 130 and compressor 290, these may be mechanically connected and driven directly by the mechanical energy available from heat engine 10 with the remaining mechanical energy being used to drive the electric generator earlier described. The reduction in electromotive force would be somewhat less than that required to run the compressors directly with electricity (94 kW versus 100 kW). For example, the following operating conditions can be considered:

the pressure to 200 psia downstream of the gas permeable polymeric membrane.

The residual process stream which exits the gas permeable polymeric membrane gas separator via line 270 comprises at least 99% nitrogen and 1% or less carbon dioxide and at a pressure of 200 psia and at a temperature of 86° F. is forwarded to expansion turbine 300 via

| Gross Heat Engine @ 0.7 kW/hp | | Compressor 1 | | Compressor 2 | | Net Heat Engine | |
|---|---|---|---|---|---|---|---|
| | | | | | | Electric Drive Net | Direct Drive @ 0.7 kW/hp |
| 365 hp (225 kW) | minus [ | 95 hp (71 kW) | plus | 40 hp (30 kW) | ] equals | 230 hp (154 kW) | 230 hp (161 kW) |

It is most preferred, however, to use an expansion turbine to drive compressor 290.

The process stream then exits the cleaning means 240 of the present invention via line 250 and is passed to a gas permeable polymeric membrane separator 260 where the process stream is separated into a residual process stream comprising at least 99% nitrogen and at most 1% carbon dioxide (28 actual cfm) at 200 psia and a permeate process stream (139 actual cfm) at 15 psia. The residual process stream leaves the gas permeable membrane separator via line 270 and the permeate process stream leaves the gas permeable polymeric membrane separator 260 via line 280. The residual process stream which exits the gas permeable polymeric membrane separator 260 via line 270 is at a pressure of 200 psia and at a temperature of about 86° F. The pressure drop over the membrane separator is about 185 psia so that the permeate process stream which leaves the gas permeable polymeric membrane separator 260 via line 280 is at a pressure of about 15 psia.

In general, the carbon dioxide can be present in any concentration above 50% but must be at least 50% and generally we contemplate carbon dioxide concentrations will typically not be greater than 75%. The partial pressure of carbon dioxide determines the condensation temperature in the $CO_2$ condenser heat exchanger later discussed. The higher the concentration of carbon dioxide in the permeate stream which is generated in the gas permeable polymeric membrane separator 260 and/or the higher the total pressure of the permeate stream generated in compressor 290, the higher the condensation temperature. There must be sufficient nitrogen present in the permeate process stream which is isenthalpically expanded to supply coolant to the aftercooler before the first compression stage earlier discussed.

The permeate process stream exits the gas permeable polymeric membrane separator 260 via line 280 and is forwarded to compressor 290 where its pressure is raised to 200 psia and its temperature is still at 86° F. Following compression in compressor 290, the permeate gas stream comprises at least 50% carbon dioxide at a partial pressure of at least 100 psia and 50% or less nitrogen at a partial pressure of 100 psia or less.

Gas permeable polymeric membrane separators are commercially available from Medal (a joint venture of Du Pont and Liquid Air) and A/G Technology.

To enable the gas permeable polymeric membrane gas separator to concentrate the permeate process stream to at least 50% carbon dioxide will require the permeate side to operate at 15 psia. This leads to the need for the secondary compressor 290 which elevates optional preheater 310. In expansion turbine 300 it is expanded to about one atmosphere and cooled to about −170° F., the resultant work of expansion, equivalent to the actual change in enthalpy, being used to power the second stage compressor 290.

With reference to expansion turbine 300, the amount of work obtained from the expansion turbine 300 can also vary. The amount of work ($W = Q - \Delta H = \int V dP$, where $Q \approx 0$) may be increased by preheating the inlet residual process stream, which is substantially all nitrogen, to a temperature higher than 303° K. (86° F.) and a pressure higher than 200 psia, the outlet temperature and pressure of the gas permeable polymeric membrane separator 260. One can thus consider the following operating conditions (assume 1,510 lb/H of nitrogen):

| Resd Proc T[1]/ K.° (F.°) | Resd Proc P[2]/ psia | $W = \Delta H$ (eff = 82%) kW (hp) | Expansion T[3]/ K.° (F.°) |
|---|---|---|---|
| 323 (122) | 300 | 30.7 (41.2) | 130 (−225) |
| 373 (212) | 519 | 40.1 (53.8) | 130 (−225)* |
| 373 (212) | 300 | 35.4 (47.4) | 155 (−180)** |

*Isentropic path
**Isobaric path
[1]/Temperature of the residual process stream in line 270.
[2]/Pressure of the residual process stream in line 270.
[3]/Temperature of the residual process stream in line 320.

The residual process stream, after it has performed its work in the expansion turbine 300, exits expansion turbine 300 via line 320 and is forwarded to $CO_2$ condenser heat exchanger 330 via line 320 where it is used to cool the permeate process stream which enters the $CO_2$ condenser heat exchanger 330 via line 340. After performing its cooling function in the $CO_2$ condenser heat exchanger 330, the residual process stream exits the $CO_2$ condenser heat exchanger via line 100. It still comprises at least 99% nitrogen, is still at one atmosphere, but its temperature has increased to about 0° F. If is then forwarded to the precooler 90 via line 100 where it performs its cooling functions as earlier explained.

The permeate process stream 340 which exits compressor 290 at about 200 psia and about 86° F. is forwarded via line 340 to the $CO_2$ condenser heat exchanger 330 where the permeate process stream is cooled to a final temperature of about −54° F. and where substantially all of the carbon dioxide is condensed to a liquid phase and the pressure is reduced to about 100 psia with the simultaneous formation of a nitrogen-rich gas phase at about −54° F. and about 100 psia. The liquid carbon dioxide and the nitrogen-rich gas phase exit $CO_2$ condenser heat exchanger 330 via line 350 and pass into $CO_2$ receiving tank 360 where gravity separation into a carbon dioxide liquid phase and a nitrogen gaseous phase occurs.

In the event the partial pressure of carbon dioxide is about 150 psia (10.2 atmospheres) in line 340 and the $CO_2$ condenser heat exchanger 330 temperature is about 230° K. (about −40° F.), then the heat lift in the $CO_2$ condenser heat exchanger may be wholly or in part accomplished using an evaporator coil of a vapor compression refrigeration loop operating at about −40° F., where the working fluid could be, for example, Freon-502 or ammonia. For instance, if the carbon dioxide concentration in the permeate process stream is 75% and the total pressure is 200 psia (13.6 atm), then the carbon dioxide partial pressure is about 150 psia (10.2 atmospheres) (0.75×200=150). At that pressure, carbon dioxide condenses at −40° F.

The nitrogen-rich gas phase which exits the $CO_2$ condenser heat exchanger 330 via line 350 and passes into $CO_2$ receiving tank 360 exits the $CO_2$ receiving tank 360 via line 210 and is passed through expansion valve 370 where its pressure is reduced isenthalpically to about one atmosphere and its temperature is lowered to about −60° F. At this stage it comprises at least 99% nitrogen. The thus expanded and cooled nitrogen-rich gas stream is then forwarded via line 210 to aftercooler 200 where its sensible heat lift is applied to cool the process stream passing through aftercooler 200 to 77° to 125° F. The nitrogen-rich gas stream, after it has performed its cooling function in aftercooler 200, exits aftercooler 200 via line 220 and can be used for any desired purpose.

The condensed or liquid carbon dioxide which is at least 99% liquid carbon dioxide at a pressure of at least about 100 psia and at a temperature of about −54° F. is collected in the liquid $CO_2$ receiving tank 360 where a liquid level is maintained and liquid carbon dioxide product is continually forwarded through line 380 to a pump (not shown) where it is elevated to a discharged pressure of about 290 psia and at 0° F. ± to a pressurized storage vessel (not shown) maintained at about 290 psia and at about 0° F. where liquid carbon dioxide is drawn off as needed to an outside application.

With respect to the streams entering and exiting the membrane gas separator 260, the $CO_2$ condenser heat exchanger 330 and the $CO_2$ liquid phase exiting the $CO_2$ receiving tank 360, the compositions and operating pressures of these streams may, of course, vary. For example, the membrane gas separator 260 may be operated with a residual process stream pressure of more or less than 300 psia and with a permeate process stream pressure of more or less than 200 psia. In addition, the pressure drop across the membrane gas separator 260 may be more or less than 100 psia. Of course, the composition of both process streams may vary. For example, the composition of the permeate stream in line 280, carbon dioxide in this case, may be more or less than 50% and the composition of the residual process stream which exits expansion turbine 300, nitrogen in this case, may be more or less than 99%.

For example, the following operating conditions are believed to show a series of representative useful operating conditions:

| (1) psia | (2) psia | (3) psia | (4) % $CO_2$ | (5) psia | (6) °K. (°F.) | (7) psia(atm) |
|---|---|---|---|---|---|---|
| 300 | 200 | 285 | 50 | 100 | 225(−54) | 100(6.8) |
| 200 | 200 | 185 | 50 | 100 | 225(−54) | 100(6.8) |
| 200 | 150 | 185 | 60 | 90 | 220(−63) | 90(6.1) |
| 250 | 150 | 235 | 67 | 100 | 225(−54) | 100(6.8) |
| 300 | 250 | 285 | 60 | 150 | 233(−40) | 150(10.2) |
| 300 | 200 | 285 | 75 | 150 | 233(−40) | 150(10.2) |
| 200 | 200 | 185 | 75 | 150 | 233(−40) | 150(−10.2) |
| 250 | 150 | 235 | 50 | 75 | 216(−70) | 75(5.1)* |

*Condensed phase is a solid at 5.1 and lower

The columns in the above table have the following meanings:
(1) Pressure of the process stream entering the membrane gas separator 260 via line 250.
(2) Operating pressure of recompressed permeate stream from the membrane gas separator 260.
(3) Pressure drop over the membrane gas separator 260.
(4) Percent of $CO_2$ in the permeate gas stream 280 exiting the membrane gas separator 260.
(5) Partial pressure of the $CO_2$ in the permeate gas steam 280 exiting the membrane gas separator 260.
(6) Temperature in the $CO_2$ condenser heat exchanger 360.
(7) Pressure in the $CO_2$ condenser heat exchanger 360.

While the invention has been described in detail and with reference to specific embodiments thereof, it will be apparent to one skilled in the art that various changes and modifications can be made therein without departing from the spirit and scope thereof.

What is claimed is:
1. A process for producing liquid carbon dioxide which comprises:
 (a) cooling a process stream which comprises from about 10 to about 50% carbon dioxide, balance substantially nitrogen, and water, whereby a minor amount of the water is condensed out of the process stream;
 (b) compressing the process stream, whereby substantially all of the water but trace amounts is condensed out of the process stream;
 (c) treating the cooled process stream to remove the trace amounts of water, any long-chain hydrocarbons present and any particulates present;
 (d) separating the process stream into a nitrogen-rich gaseous stream and a carbon dioxide-rich gaseous stream which contains at least 50% carbon dioxide;
 (e) compressing the carbon dioxide-rich gaseous stream of step (d);
 (f) expanding the nitrogen-rich gaseous stream of step (d) to produce an expanded nitrogen-rich gaseous stream and using the energy of such expanding to compress the carbon dioxide-rich gaseous stream in step (e);
 (g) cooling the carbon dioxide-rich gaseous stream from step (f) to liquefy the carbon dioxide therein and reduce the temperature of the nitrogen therein, the nitrogen remaining gaseous;
 (h) withdrawing the thus liquefied carbon dioxide of step (g); and
 (i) wherein the liquefying of the carbon dioxide-rich gaseous stream in step (g) is by using the expanded nitrogen-rich gaseous stream which has been expanded in step (f) and, after said liquefying of said carbon dioxide-rich gaseous stream, thereafter using said nitrogen-rich gaseous stream to perform at least part of said cooling of step (a).

2. The process of claim 1, which further comprises cooling the process stream after the compressing the step (b).

3. The process of claim 2, which further comprises expanding the nitrogen which remains gaseous in step (g) and using the thus expanded nitrogen to perform the cooling of the process stream after the compressing of the process stream of step (b).

4. The process of claim 1, wherein the water is removed in step (c) using a molecular sieve and the hydrocarbons are removed using activated carbon.

5. The process of claim 1, wherein in step (d), said process stream is separated into the nitrogen-rich gaseous stream and the carbon dioxide-rich gaseous stream using a membrane separator.

6. A process for producing electricity, heat, and liquid carbon dioxide which comprises:
   (a) combusting a mixture of fuel and oxygen in a heat engine to drive an electrical generator with the product of said heat engine to thereby produce electricity and also yielding a process stream comprising carbon dioxide, balance substantially nitrogen and water;
   (b) cooling the process stream of step (a), whereby a minor amount of the water is condensed out of the process stream;
   (c) compressing the process stream from step (b), whereby substantially all of the water but trace amounts is condensed out of the process stream;
   (d) treating the cooled, compressed process stream of step (c) to remove water, any long chain hydrocarbons present, and any particulates present, whereby substantially all of the water but trace amounts is condensed out of the process stream;
   (e) separating the process stream from step (d) into a nitrogen-rich gaseous stream and a carbon dioxide-rich gaseous stream which contains at least 50% carbon dioxide;
   (f) compressing the carbon dioxide-rich gaseous stream of step (e);
   (g) expanding the nitrogen-rich gas stream of step (e) to produce an expanded nitrogen-rich gaseous stream and using the energy of such expanding to compress the carbon dioxide-rich gaseous stream in step (f);
   (h) cooling the carbon dioxide-rich gaseous stream from step (g) to liquify the carbon dioxide therein and reduce the temperature of the nitrogen therein, the nitrogen remaining gaseous;
   (i) withdrawing the thus liquified carbon dioxide; and
   (j) wherein the liquefying of the carbon dioxide-rich gaseous stream in step (h) is by using the expanded nitrogen-rich gaseous stream which has been expanded in step (g) and, after said liquefying of said carbon dioxide-rich gaseous stream, thereafter using said nitrogen to perform at least part of said cooling of step (b).

7. The process of claim 6, which further comprises cooling the process stream after the compressing of step (c).

8. The process of claim 7, which further comprises expanding the nitrogen which remains gaseous in step (h) and using the thus expanded nitrogen to perform the cooling of the process stream after the compressing of the process stream of step (c).

9. The process of claim 6, wherein the water is removed in step (d) using a molecular sieve and the hydrocarbons are removed using activated carbon.

10. The process of claim 6, wherein in step (e), said process stream is separated into the nitrogen-rich gaseous stream and the carbon dioxide-rich gaseous stream using a membrane separator.

11. Apparatus for the production of liquid carbon dioxide which comprises:
   a) means for cooling a process stream, which process stream comprises nitrogen, carbon dioxide and water whereby a minor portion of the water is removed therefrom;
   b) means for compressing the cooled process stream from step a), whereby substantially all of the remaining water is removed therefrom, leaving only trace amounts of water;
   c) means for removing the trace amounts of water and any hydrocarbons larger than methane from the compressed process stream from step b);
   d) means for separating the process stream from step c) into
      d1) a process stream which is substantially completely nitrogen; and
      d2) a process stream which contains substantially all of the carbon dioxide in the process stream and the balance of the nitrogen in the process stream;
   e) means for expanding the process stream d1) into an expanded process stream d1) and means for forwarding the expanded process stream d1) to means g) for cooling a compressed process stream d2), which expanding means drives;
   f) means for compressing said process stream d2);
   g) means for cooling the compressed process stream d2), whereby the process stream d2) is separated into a liquid carbon dioxide stream g1) and a gaseous stream which is substantially completely nitrogen g2), the means for cooling the compressed process stream d2) being the expanded process stream d1) generated with step e); and
   h) means for forwarding the gaseous stream d1) which is substantially completely nitrogen from step g) to the means for cooling the process steam of step a), where the gaseous stream d1) which is substantially completely nitrogen from step g) performs the cooling of step a).

* * * * *